United States Patent [19]
Anderson

[11] Patent Number: 5,469,168
[45] Date of Patent: Nov. 21, 1995

[54] OCEANOGRAPHIC AND METEOROLOGICAL DATA

[75] Inventor: Stuart J. Anderson, Glen Osmond, Australia

[73] Assignee: The Commonwealth of Australia, C/-The Secretary, Department of Defence, Canberra, Australia

[21] Appl. No.: 146,026
[22] PCT Filed: May 15, 1992
[86] PCT No.: PCT/AU92/00225
§ 371 Date: Nov. 8, 1993
§ 102(e) Date: Nov. 8, 1993
[87] PCT Pub. No.: WO92/21041
PCT Pub. Date: Nov. 26, 1992

[30] Foreign Application Priority Data

May 16, 1991 [AU] Australia ................... PK6187
May 16, 1991 [AU] Australia ................... PK6188

[51] Int. Cl.$^6$ .................................................. G01S 13/95
[52] U.S. Cl. .................................... 342/26; 342/192
[58] Field of Search .............................. 342/25, 26, 192, 342/196, 159

[56] References Cited

U.S. PATENT DOCUMENTS 4,053,886 10/1977 Wright et al. .................... 342/192

FOREIGN PATENT DOCUMENTS 2480945 10/1981 France .
2063003 5/1981 United Kingdom .

OTHER PUBLICATIONS

T. M. Georges et al: "An Opportunity for Long–Distance Oceanographic and Meteorological Monitoring using Over–the–Horizon Defense Radars"; Bulletin American Meteorological Society; pp. 1739–1745.
Abstract—INSF—WO6—M2649 D/48.

Australian Patent Application No. PK6899, Jun. 27, 1991.

Madden, J. M., "The Adaptive Suppression of Interference in HF Ground Wave Radar", Radar International Conference Oct. 19–21, 1987, pp. 98–102.

Anderson, S. J., Radar International Conference, Oct. 19–21, 1987, pp. 609–612.

Anderson, S. J., "Adaptive Remote Sensing with HF Skywave Radar", *IEE Proceedings*, Apr. 2, 1992, pp. 182–192.

*Primary Examiner*—Daniel T. Pihulic
*Attorney, Agent, or Firm*—Cushman Darby & Cushman

[57] ABSTRACT

A method of obtaining oceanographic and meteorological data from high frequency radar spectral information including the steps of transmitting a plurality of signals to a remote geographic location, recording signals backscattered from the said location, generating a family of Doppler clutter spectra from the recorded backscattered signal and analyzing the Doppler clutter spectra in terms of a model or models to generate oceanographic and meteorological data estimates. The Doppler spectra are categorized according to Suitability for Deatiled Analysis (SDA). The SDA takes account of the clutter-to-noise ratio in the spectrum, the amplitudes of the Bragg-lines, multimode propagation, spectral broadening and other spectral parameters. Spectra with a low SDA are inappropriate for extracting directional wave spectrum estimates of reasonable accuracy but are useful for obtaining wind direction estimates. Spectra with a high SDA are capable of being inverted to provide good quality estimates of the extended directional wave spectrum.

31 Claims, 11 Drawing Sheets

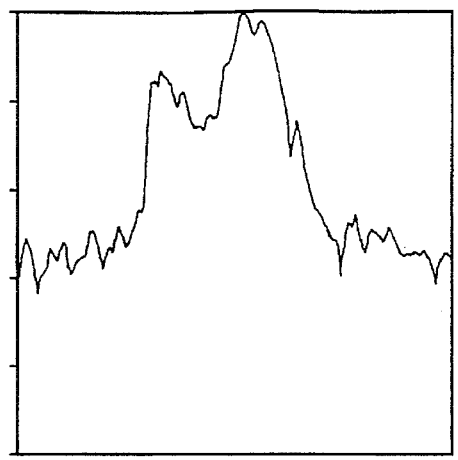
FIG 5 (cat 2)
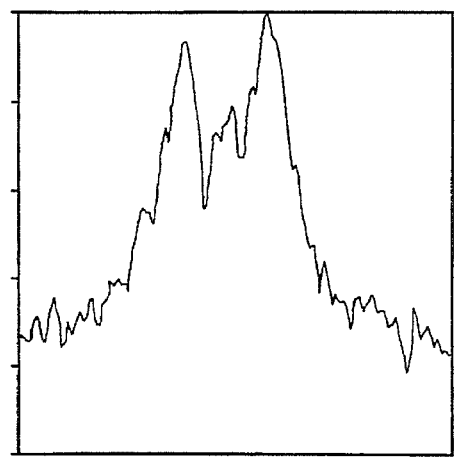
FIG 5 (cat 3)
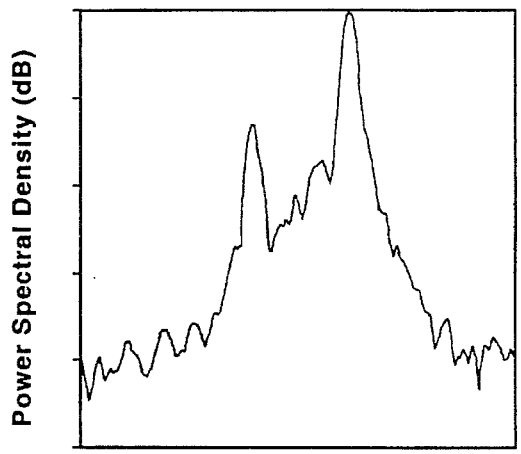
FIG 5 (cat 5)
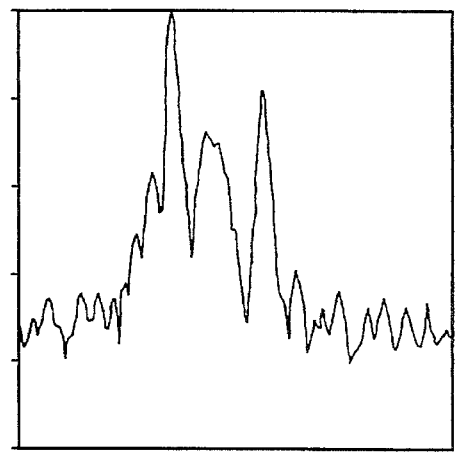
FIG 5 (cat 6)
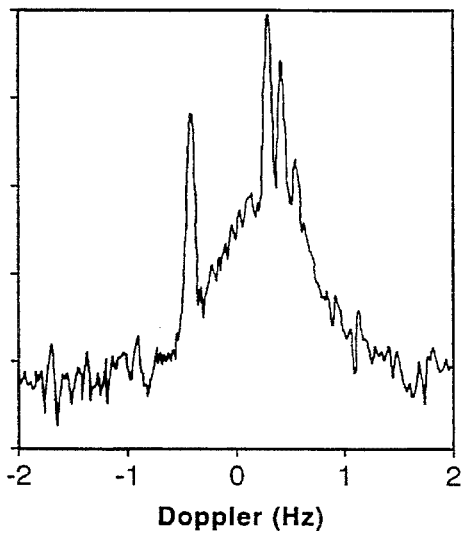
FIG 5 (cat 8)
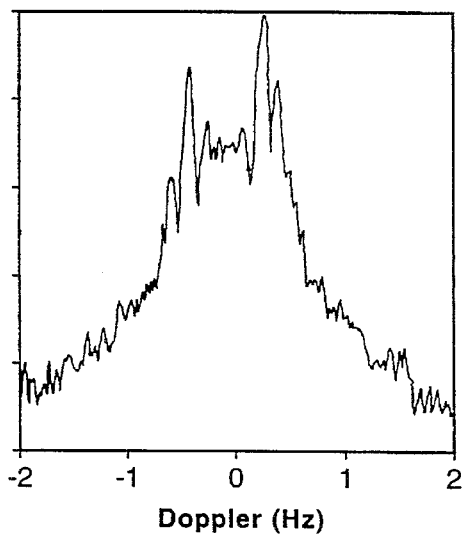
FIG 5 (cat 9)

PARALLEL INVERSION (ZERO COUPLING MODEL)
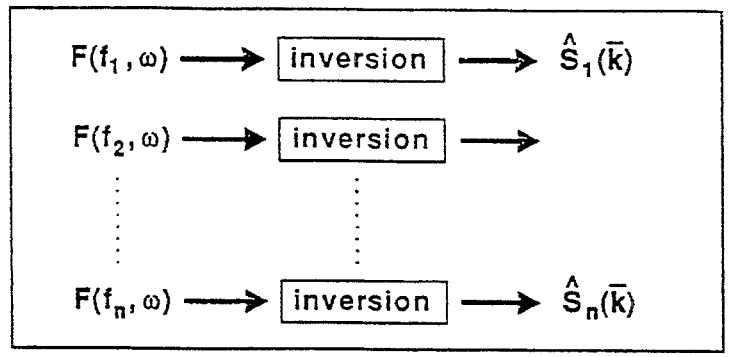
JOINT CONSTRAINED INVERSION (WEAK COUPLING MODEL)
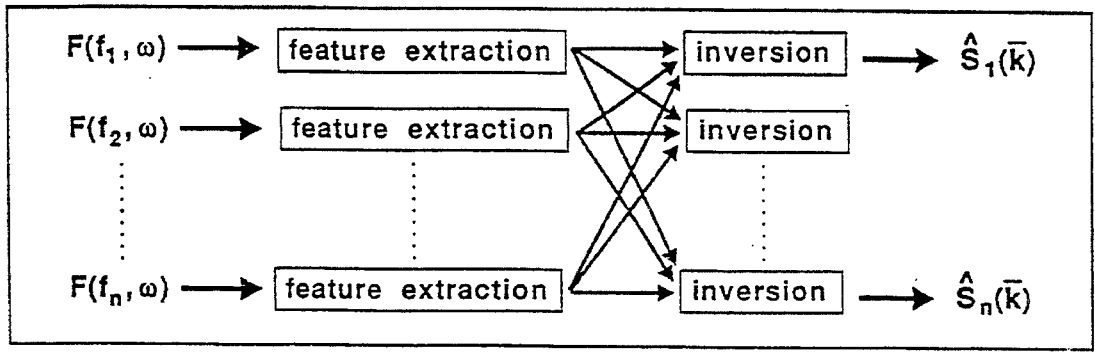
JOINT INVERSION (STRONG COUPLING MODEL)
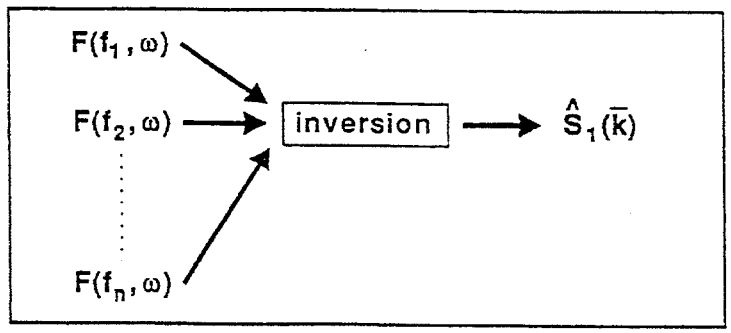
FIG 10

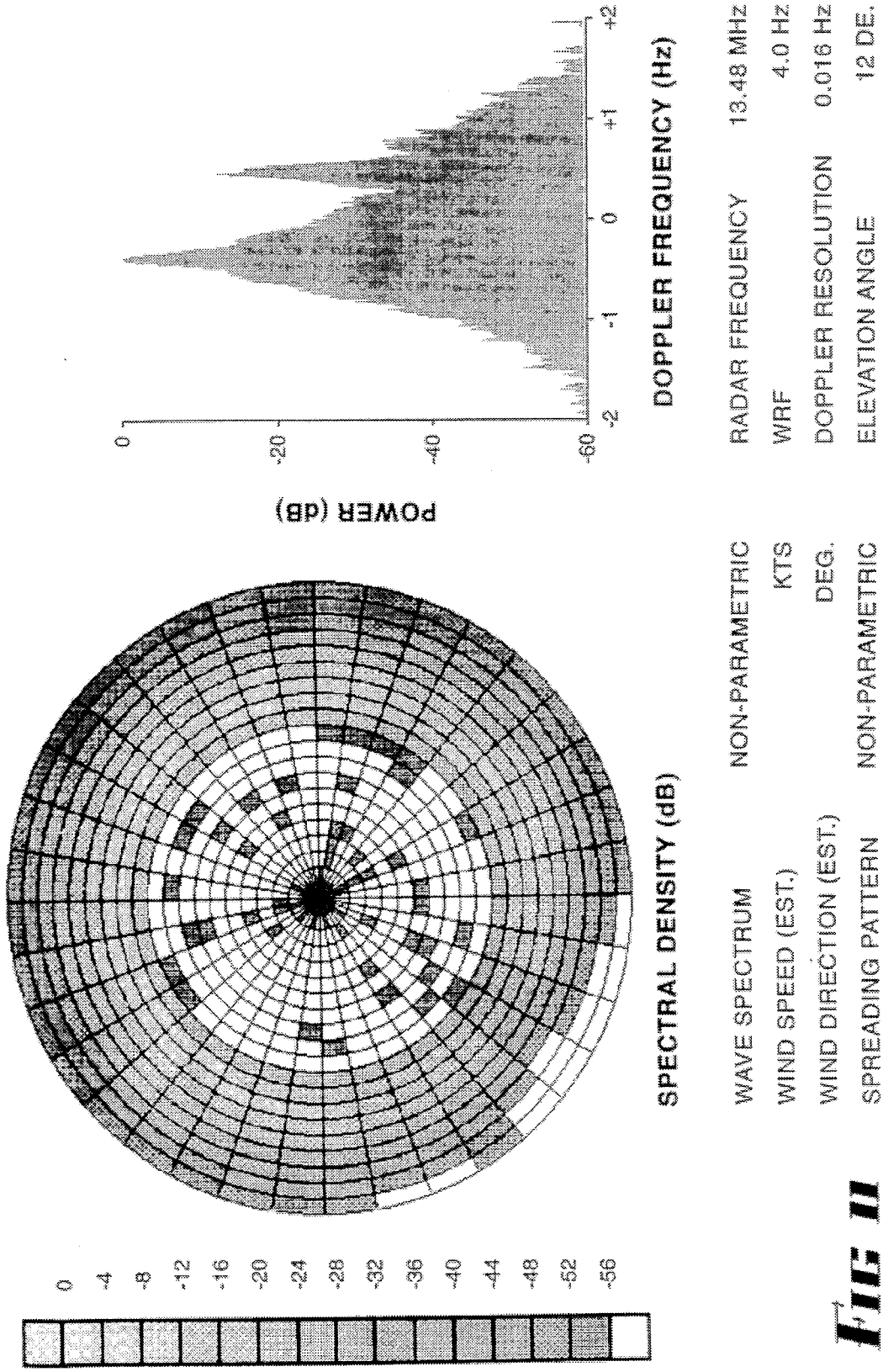

OCEANOGRAPHIC AND METEOROLOGICAL DATA

BACKGROUND OF THE INVENTION

This invention relates to a scheme for obtaining oceanographic and meteorological information from high frequency radio waves scattered from the sea surface. Such waves may have been generated by a skywave radar facility or they may be transmissions of opportunity radiated by HF broadcasters or other sources, man-made or natural.

Reliable measurements of the ocean wave fields, on a large scale, are costly and difficult to obtain. Observations over an entire region, at high spatial resolution, are currently beyond the capabilities of all but two techniques. One is satellite-born sensors and the other is high frequency (HF) skywave radar or Over-the-Horizon Radar (OTHR). If high temporal resolution is also a requirement then OTHR is the only sensor currently available.

Unlike the traditional ground-based radars, which can only see as far as the horizon, an OTHR can make surface observations up to 4000 km away, sometimes further, unconstrained by the earth's curvature. This is made possible by the existence of a radio-reflective layer in the Earth's upper atmosphere—the ionosphere—which extends from about 100 to over 300 km above the Earth's surface.

The OTHR concept is straightforward. A signal is beamed obliquely upwards from a transmitter and reflected down from the ionosphere to illuminate an area of interest; the echoes from the Earth's surface and any targets present travel by a similar path back to a receiver which is usually separated from the transmitter. Notwithstanding the simplicity of the concept, successful exploitation relies on a detailed understanding of the ionosphere, which changes with geographic location, time of day, season of year, sunspot activity and other influences. The coverage of an OTHR is potentially severally million square kilometers for a single installation.

Implicit in OTHR echoes from the sea surface is information about the amplitude, frequency and direction of travel of the wind-generated water waves, which have wavelengths comparable to HF radar wavelengths and thus provide a basis for resonant scattering processes. This continuum of gravity waves can be represented under most conditions by a directional wave spectrum, $S(k)$, that is, a superposition of sinusoidal waves satisfying the deep water dispersion relation. Weak nonlinear interactions between these fundamental waves produce small amounts of additional waves which need not satisfy the dispersion relation. As the wave field is generated primarily by the winds above the surface, determination of the wave conditions enables inferences to be drawn about the wind field which produced them.

SUMMARY OF THE INVENTION

It is an objective of this invention to provide a scheme for the automatic extraction of oceanographic and meteorological information from HF radio waves scattered from the sea surface.

There is a growing demand for high quality oceanographic information by a host of agencies, whose interests range from theoretical studies of the transport of energy and momentum across the air-sea interface to the needs of engineers designing offshore structures. Some of these users require near real-time information and forecasts, as for ship routing, tropical cyclone tracking, and scheduling of off-loading activities at oil drilling platforms. There is also a continuing need for synoptic monitoring of sea conditions to provide calibration information for the radar itself. These tasks have the common need to look in a particular place at a particular time, though to be consistent with the resolution of the radar and wave development times, a time margin of two or three hours usually suffices to maintain a globally consistent 'real-time' picture.

At the other extreme, there is keen interest in the accumulation of regional wave climatologies and measurements of large scale events such as the summer monsoon, which may contribute to global environmental research. In this case, the decision of where and when to gather data is relatively unconstrained and the radar can await the occurrence of good propagation conditions to a given area before estimating the wave field parameters there.

A further objective of this invention is to estimate $S(k)$ from the measured Doppler spectrum of the scattered radio waves.

The extraction of this information is often frustrated by various types of signal corruption which occur during propagation through the ionosphere. In particular, directional wave spectra can be determined only when signal degradation is not significant.

It is another objective of this invention to provide a new inversion technique for the estimation of the two-dimensional directional wave spectrum which combines computational efficiency with the generality of a non-parametric approach.

In order to comprehend the invention, it is first necessary to understand the scattering of radio waves from the sea surface and the signal processing employed to obtain HF Doppler spectra from the radar echoes. These will be described with reference to a known Over-the-Horizon radar system.

The principle of Over-the-Horizon Radar (OTHR) is to radiate high frequency (HF) signals via the ionosphere to long ranges then analyse the backscattered return signal for target and environmental information. The backscattered return data is processed over four domains; namely, azimuth, slant range, Doppler and time. Skywave radars can achieve better than 10 km resolution in the range direction under some circumstances, though cross-range dimensions are usually somewhat greater. Thus skywave radars can resolve the characteristic features of the ocean surface signatures of systems far below the synoptic scale.

The basic pattern of operation of an HF skywave radar involves maintaining a coherent illumination of a region for a period typically of some tens of seconds, before stepping on to the next region of interest. Each region may exceed 100,000 square kilometers in area, so that only a few regions are needed to cover most systems of interest. It follows that revisit times of 1–3 minutes are achievable, well within the time taken for appreciable system evolution.

The echoes of interest are produced by scattering from the rough sea surface which is made up of a continuum of gravity waves which are driven by surface winds. Strong (first order) radar echoes are observed from those waves satisfying the Bragg resonance condition, with second order contributions resulting from both double Bragg scatter and single Bragg scatter from the evanescent or virtual waves arising from nonlinear wave-wave interactions. The clutter Doppler spectrum $D(w)$ can be written as:

$$D(w) = \int F(k_1, w) S(k_1) dk_1 + \iint G(k_1, k_2, w) S(k_1) S(k_2) dk_1 dk_2$$

where F and G are first and second order scattering functions.

The directional wave spectrum S(k) can in principle be determined from the measured clutter Doppler spectrum by solving this equation. While the directional wave spectrum provides a detailed description of the sea surface conditions, partial information can be obtained from particular features of the clutter Doppler spectrum. For example, the ratio of the first order peaks—the Bragg lines—has long been used as an indicator of wind direction. A progression of increasingly subtle spectrum features can be analyzed to yield additional data about S(k). For instance, spectrum peaks due to non-linear hydrodynamic interaction of longer waves than those responsible for the Bragg peaks can be used to measure the low frequency behavior of the wave spectrum.

Techniques for global estimation of S(k), at least for wave frequencies below about 1 Hz, have been developed. Two approaches have proved successful, one based on fitting parametric wave models to radar data, the other a general non-parametric method which is more expensive in terms of computational load.

The extraction of the desired oceanographic and meteorological information is often frustrated by various types of signal corruption which occur during propagation through the ionosphere. In particular, directional wave spectra can be determined only when signal degradation is not significant. Difficulties arise from the fact that an OTHR is affected by clutter and noise from sources other than sea surface back-scatter, such as aurorae, meteors, jamming, atmospherics, galactic noise and internal noise. Furthermore, various ionospheric phenomema induce effects such as spectral blurring, Doppler shifts and superimposed multipath echoes. The combined effects of background noise and ionospheric effects serve to diminish the resolution of surface clutter spectral features. Special signal processing techniques are used to mitigate this contamination.

The level of sophistication of the meteorological and oceanographic information which can be obtained from OTHR Doppler spectra is strongly dependent on the quality of the spectral data collected. A hierarchy of ten information categories classified by Suitability for Detailed Analysis (SDA) from least to most stringent spectral data requirement can be defined:

1. NO INFORMATION
2. WIND DIRECTION
3. WIND SPEED REGIME
4. SEA STATE
5. DOMINANT WAVE PERIOD
6. SIGNIFICANT WAVE HEIGHT
7. DOMINANT WAVE DIRECTION
8. NONDIRECTIONAL WAVE SPECTRUM
9. DIRECTIONAL WAVE SPECTRUM
10. EXTENDED DIRECTIONAL WAVE SPECTRUM

It is inefficient and futile to attempt to determine the directional wave spectrum, for example, from data which is only suitable for extracting the wind direction.

It is another intended object of this invention to provide the public with reliable meteorological and oceanographic information.

Therefore, according to one form of this invention there is proposed a method of obtaining oceanographic and meteorological data from high frequency sea clutter spectral information comprising the steps of transmitting a plurality of signals to a remote geographic location, recording signals backscattered from the said location, generating a family of Doppler clutter spectra from the recorded backscattered signal and analysing the Doppler clutter spectra in terms of a model or models to generate oceanographic and meteorological data estimates.

By preference, the recorded signals are corrected for contamination by radio frequency interference and other forms of degradation.

By preference, the Doppler spectra are categorized according to Suitability for Detailed Analysis (SDA).

The SDA takes account of the clutter-to-noise ratio in the spectrum, the amplitudes of the Bragg lines, mutimode propagation, spectral broadening and other spectral parameters. Spectra with a low SDA are inappropriate for extracting directional wave spectrum estimates of reasonable accuracy but are useful for obtaining wind direction estimates. Spectra with a high SDA are capable of being inverted to provide good quality estimates of the extended directional wave spectrum.

One method of establishing the SDA category is to use an incremental analysis technique. In this method a first parameter of the spectrum is measured and a decision made on whether information can be obtained from the spectrum. A negative decision means the spectrum falls into category 1, a positive decision means the spectrum falls into a higher category. The spectrum is then tested against a second parameter to further define the category and so on until the appropriate SDA category is determined.

The parameters of the spectrum which are measured include sub-clutter visability (SCV), Bragg line amplitudes, the amplitudes of other peaks and resonances in the Doppler spectrum, the widths of these peaks, weighted sums of clutter spectral density over various Doppler frequency bands, parameters describing the slope and curvature of the Doppler spectrum over various Doppler frequency bands, and measures of the spatial and temporal variations of the Doppler spectrum.

By preference, the meteorological data includes wind speed, wind direction and parameters derived therefrom such as vorticity and shear. By preference the plurality of signals transmitted to the remote location have a range of carrier frequencies. By obtaining data in different regions of the frequency spectrum the integrity of the oceanographic and meteorological estimates is improved.

By preference, the wind direction is determined from the Bragg line ratio using an empirical relationship taking account of wavenumber to determine the angular spreading function; this estimate can then be refined using second order contributions.

By preference, the wind speed is obtained from the second order Doppler spectrum in conjunction with the first order contributions.

By preference, ambiguity resolution is achieved by using a fluid model to analytically continue a wind field based upon seed values obtained from in situ sensors. For example, automatic offshore weather stations can provide the appropriate seed information on wind direction.

By preference, maps of wind speed and direction are produced and displayed in real time. The maps are displayed at color display terminals at which the operator can display a range of other features of interest including a sequence of maps, day-to-day difference maps, vorticity and data quality parameters.

By preference, the oceanographic data includes sea state, dominant wave period, significant wave height, dominant wave direction, ocean currents, nondirectional wave spectrum, directional wave spectrum and extended directional wave spectrum.

By preference, the oceanographic information is obtained from the second order Doppler spectrum in conjunction with the first order contributions.

The sea state is estimated by identifying uncontaminated parts of the Doppler spectrum and either (i) fitting a parametric wave spectrum model from above and below to obtain bounds on the associated wave heights, or (ii) computing a weighted sum of the Doppler spectral estimates.

Dominant wave period is obtained from the separation between first order and second-order contributions to the Doppler spectrum, taking processing factors into account.

Significant wave height is obtained from the ratios of spectrum peaks at the first and second order resonances and weighted energy integrals over sub-bands of the Doppler spectrum.

Dominant wave direction is estimated from the relative amplitudes of the second-order cut-off points.

Ocean currents are estimated by analytic continuation of radial current fields measured by (i) Doppler shifts of the two Bragg lines relative to zero-Doppler echoes from islands or oil rigs, or (ii) estimates of mean clutter Doppler shifts from long-term behavior of ionospheric Doppler shifts.

Nondirectional wave spectra are estimated from the shape and cut-off of the second-order continuum beyond the dominant Bragg line after weighting with a pre-computed function.

Directional wave spectra are estimated by iterative adjustment of a nonparametric discrete wave spectrum model, or by solving a linearized form of the integral equation given earlier.

By preference, the determination of oceanographic and meteorological data is fully automatic, requiring no human intervention. Nevertheless, interactive Doppler spectrum model fitting is preferably available.

In a further form of this invention there is provided a method of obtaining an estimate of the directional wave spectrum from HF sea clutter spectral information comprising the steps of:

transmitting via the ionosphere a plurality of signals into a remote locality containing a sea surface;

recording signals backscattered from the locality via the ionosphere; converting the backscattered signals to Doppler spectra; and numerically inverting the Doppler spectra from the plurality of signals to obtain a directional wave spectrum.

By preference, the recorded signals are corrected for contamination by radio frequency interference.

By preference, the plurality of signals transmitted to the remote location have a range of carrier frequencies. By obtaining data in different regions of the frequency spectrum the integrity of the estimated directional wave spectrum is improved.

By preference, the step of numerical inversion is performed by iteratively fitting discretized theoretical spectra to the measured Doppler spectrum. This process is enhanced by applying greater weight to the fitting of certain key spectral features.

In a further form of this invention there is provided a method of obtaining oceanographic and meteorological data from high frequency radio wave echoes comprising the steps of: resource allocation; signal diagnosis; signal correction; adaptive task assignment; method selection; processing, storage and display; and performance evaluation.

By preference, the resource allocation step involves making the best use of system hardware and optimising the distribution of activities.

Modern skywave radars generally incorporate a Frequency Management System (FMS) which continuously monitors the ionosphere by a combination of quasi-vertical, oblique and backscatter sounders. In addition, the FMS measures HF spectrum usage and finds clear channels where the radar can operate without interfering with other users.

From these subsystems, the geographical distribution of radar sensitivity and propagation stability can be mapped as a function of radar frequency, though generally at a much lower resolution than could be achieved by the main radar.

The first step in remote sensing is to examine the synoptic picture of the propagation environment provided by the FMS. If the mission is focussed on a particular region, the frequency band offering adequate sensitivity should be identified and path stability measurements made via range-Doppler analysis. If, on the other hand, the mission is to update the synoptic meteorological and oceanographic database, the radar surveillance pattern should be redefined to exclude regions where no frequency is currently yielding adequate illumination.

In general, it is better to choose an operating frequency which minimizes signal distortion, in particular spectral broadening, rather than to 'tune' the radar to scatter preferentially from particular waves, but there are exceptions to this rule. For example, at low sea states it is often misleading to operate at low radar frequencies when wind information is sought, since the dominant contributions to the Doppler spectrum may then arise from waves which are not locally generated by the prevailing winds.

The best solution is to obtain Doppler spectra at multiple frequencies in rapid succession, after which the fidelity of the wave field parameter estimates can be enhanced. Here the choice of frequencies to be used can be established via inspection of synthetic spectra, either from an on-line library or computed in real time if massive computing power is available.

The next step is to select a suitable waveform. Weighted, linearly swept, frequency modulated CW waveforms are the popular but not exclusive choice. The waveform parameters are governed by a number of factors, such as the availability of clear channels, the scale size of the weather system of interest, the waveform repetition frequency needed to prevent aliasing at the prevailing sub-clutter visibility (SCV) level and system processing capacity.

In general, bandwidths in the range 15–80 kHz are appropriate, with averaging over range and azimuth to produce smoothed spectra for analysis. Homotopic filtering techniques can be helpful adjuncts to incoherent integration. Experience has shown that WRF's of 4–5 Hz are well matched to clutter characteristics at HF, though at low frequencies somewhat lower values can be employed.

The coherent integration time sets the classical limit to spectrum resolution and is selected based upon consideration of such parameters as: path stability and prospects for Doppler desmearing; the spectrum estimation technique used and the choice of window; processing restrictions such as FFT lengths; availability and applicability of high resolution estimators for some sea surface parameters; the expected dominant wave frequency in the region of interest; and possible swell parameters.

By preference, the signal diagnosis step involves automatic examination and classification of the received signals in terms of data quality and suitability for the various levels of detailed analysis.

Adapting the radar parameters and signal processing scheme to match the characteristics of the prevailing data involves feedback and feedforward of control information; this information is generated by the signal diagnosis step, which determines the nature and extent of signal contamination and distortion and flags the need for radar parameter changes or ameliorative signal processing.

The key to signal diagnosis is our a priori knowledge of the characteristics of sea clutter recorded under ideal conditions with the current radar parameters. By extracting certain features of the measured data and using these in a pattern classification scheme, each spectrum can be assessed with respect to a set of common forms of degradation. Then, on the basis of experience with parameter estimation from variously corrupted spectra, the individual spectra can be assigned to one of the ten SDA (Suitability for Detailed Analysis) categories, each of which is defined by the list of oceanographic and meteorological variables which it is sensible to attempt to extract from data with the given characteristics.

The essence of signal diagnosis is establishing which remote sensing information has been destroyed by the degradation of the signal and, conversely, which oceanographic and meteorological parameters can sensibly be estimated in the presence of the imperfections. Rules for answering these questions can be derived by theoretical modelling in which measured spectra are deliberately corrupted by simulated ionospheric effects whose parameters are themselves derived from measurements, thereby ensuring that the model is realistic. The practical implementation of real-time automatic signal diagnosis in a skywave radar system can be accomplished by means of pattern recognition techniques.

Central to the effectiveness of such an approach is the use of well-chosen features. Classification in spaces of high dimension is computationally very expensive, so a few good features affording reasonable discrimination are to be preferred to more comprehensive descriptions. Two distinct options are available—(i) purely feature-based statistical classification, and (ii) model-based parameter estimation techniques such as deconvolution. In the former, a number of scalar features including the function complexity index, the locations and spectral widths of the main peaks and the sub-clutter variability are used to represent the spectrum, with a linear discriminant function classifier.

The latter option uses a first estimate of the Bragg line ratio and collateral information to select an ideal spectrum which is then used in a deconvolution procedure to determine the Doppler shift, spectral broadening and the occurrence of discrete multimode.

At the output of the signal diagnosis stage, each input Doppler spectrum has been assigned to one of the ten SDA categories. In addition, recommendations for corrective processing are generated.

By preference, the signal correction step involves application of ameliorative signal processing techniques to improve signal quality by removing contamination and distortion.

Although many signal contamination processes are irreversible, it has been demonstrated that judicious use of valid a priori information can be used to compensate for some effects.

One class of correction methods has been developed to deal with impulsive noise. Essentially, they rely on locating and excising the noise events, and then either replacing the censored data by means of some interpolation technique, prior to spectrum estimation on the uniformly-sampled sequence, or performing spectrum analysis directly on the non-uniformly sampled sequence.

A related family of techniques has been developed to handle meteor echoes, which occur in two forms—head echoes and trail echoes. Unlike RFI, which is uncorrelated with the radar transmission and hence appears spread in range and Doppler, meteor echoes are localized in both range and azimuth.

Echoes from ships and aircraft are normally the desired ouput from HF skywave radars, but in the remote sensing mission they have the potential to cause significant errors in wave field parameter estimation. Target detection algorithms are obviously an essential component of the radar signal processing but are normally invoked only after clutter suppression, data normalization and whitening, operations which destroy the remote sensing information. An expedient, if inelegant, solution is to identify cells containing target echoes and disregard the corresponding wave field estimates before storing or displaying the data. Given a suitable processing architecture, a two-pass approach is preferable.

A more prosaic area in which corrections are needed is in the conversion from radar coordinates (group delay, wavefront phase gradient, signal strength and Doppler) to physical coordinates (range, true bearing, radar cross section and radial velocity). The spatial mapping to geographical coordinates is termed 'coordinate registration' and many possible techniques have been proposed. One such technique is that proposed in co-pending Australian Provisional Patent Application number PK6899.

By preference, the adaptive task assignment step involves nominating the oceanographic and meteorological information to be extracted on the basis of data suitability, availability of collateral information and requirements.

Having established which parameters can meaningfully be extracted from each spectrum, the issue of constructing the processing sequence would seem trivial, but this is not the case. There are two fundamentally different approaches: either, to each spectrum in the dwell, apply only those processing steps which are appropriate to that spectrum, as indicated by its category; or find the 'union' of the set of processing steps which are required for at least one spectrum in the dwell, and then apply all these steps to all the spectra in the dwell, subsequently discarding the output wherever it is not included in the data category definition.

Which of these approaches is to be preferred depends on the processor architecture, the extent of parallel processing, whether internal or external memory is involved and memory access times, the computer language being used, the consequences of arithmetic or logical errors during computations performed on inappropriate data, consequences of variable processing execution time, program modularity and size limits, and the computational burden of over-processing.

Conceptually, the simplest method is to use in-line code with jumps to by-pass overly ambitious processing steps. The main concern with this implementation is that on occasion, as with a tropical cyclone, for instance, one might wish to look at maps of waveheight, say, even when the data quality does not pass the threshold for reasonable waveheight estimation. While it might be thought that examining individually 'worthless' estimates is pointless, it can happen that a pattern emerges in the synoptic presentation of the data. This possibility is excluded by the strictly adaptive approach.

By preference, the method selection step involves choosing which technique should be employed to estimate each parameter.

The range of signal processing methods for HF radar remote sensing is constantly being expanded, as new techniques are developed and refined. Often more than one method is available for estimating a given parameter.

By preference, processing, storage and display involves execution of the requested task, storing processed data on disk or tape if desired and presentation of results on color displays.

Normally, the remote sensing tasks are invoked automatically when the radar is operating with suitable waveform parameters and coverage. Thus wind and sea state information is produced routinely as a by-product of surveillance operations, as well as when the radar is tasked specifically to carry out remote sensing. This sometimes involves compromises in waveform and frequency selection but enables a vast amount of information to be collected. In order to manage the volume of data, only those scalar parameters that have been extracted in accordance with the SDA categories are stored. In addition, one or more Doppler spectra are stored for later inversion to obtain wavenumber spectra. The choice of spectra is based on geographic location or data quality. The disk file is archived periodically in a remote sensing database.

Geographical displays of both primary and derived parameters are crucial for real-time allocation of radar resources. Two forms of display are useful: parameter maps based on a single dwell, where the influence of impulsive events can be seen and which can be animated to reveal time histories of variables; smoothed maps which average out random fluctuations and noise effects. Primary variables such as SCV, Bragg line ratio and SDA category may be mapped continuously.

Inversion may not be routinely performed on every spectrum of adequate quality for computational load reasons. Instead, separate tasks are involved, which process selected data under interactive control with color displays to present the results.

By preference, the performance evaluation step involves real-time and offline assessment of the accuracy of remote sensing output, display of discrepancies and feedback.

Until now, the production of remotely sensed oceanographic and meteorological information in real-time from HF radar sea clutter has been of sufficient novelty that relatively little effort has gone into providing confidence intervals or other measure of uncertainty along with the data itself. This does not mean that the issue of accuracy has been overlooked. What it does signify, though, is the need to provide users of the radar-derived information with reasonable estimates of the limitations of the estimates.

BRIEF DESCRIPTION OF THE DRAWINGS

For a better understanding of this invention, a preferred embodiment will now be described with reference to the attached drawings, in which:

FIG. 5 shows representative Doppler spectra for six different SDA categories;

FIG. 10 is a schematic of the methods of combining Doppler spectrum information recorded at different frequencies to improve estimation accuracy; and FIG. 11 shows a directional wave spectrum derived by non-parametric inversion of the sea clutter Doppler spectrum.

DETAILED DESCRIPTION

Figure 1:
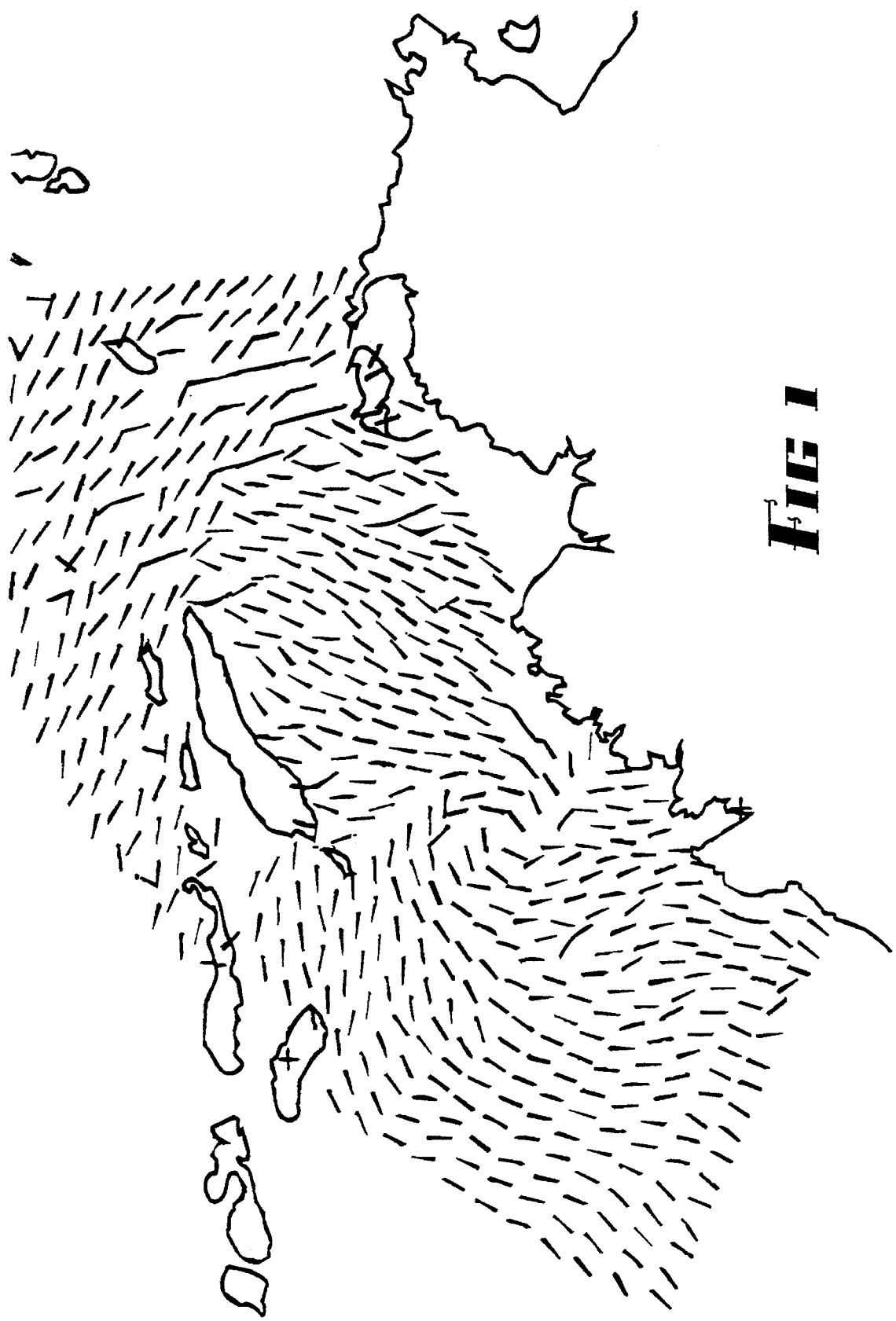
FIG. 1 shows a wind direction map obtained in accordance with this invention.

A typical OTHR is quasi-monostatic with its transmitting and receiving sites separated by about 100 km, though the present invention applies with slight modifications to truly bistatic radars. A steerable transmitting array consists of a number of vertically polarized log-periodic curtain elements, each driven by a CW transmitter which is modulated by a digitally programmed waveform synthesizer. The radar transmission-parameters including the time-delay beam steering are controlled by minicomputers at the site; these, in turn, are controlled from the receiving site via a digital link.

The receiving site includes a 2–3 km linear array of several hundred elements, each consisting of twin in-line broad-band monopoles. These may be formed into overlapped subarrays by low-loss feeder cabling, buried to preserve phase stability; these subarrays are time-delay steered by equipment located in underground bunkers. The subarray outputs are connected to a multichannel receiver whose outputs are sampled and stored in high-speed multi-port memory (MPM) ready for signal processing. The vertical patterns of both antennas are stabilized by ground screens with total area exceeding 50 hectares.

Computer control of the radar operation and signal processing is vested in a network of minicomputers. The signal processing is carried out in special high-speed array processors (ARO processors) designed with processor architecture optimized for important signal-processing algorithms. The primary man-machine interfaces are color display terminals, most connected through digital image processors to data storage devices, either the MPM or high-capacity disks.

A feature of the radar is the use of parallel/pipeline concepts in both hardware and software. One of the benefits of the design is that real-time remote-sensing information can be extracted as a zero-cost by-product of many routine surveillance modes of operation of the radar, enabling the continued supply of meteorological and oceanographic data when other priorities preclude the use of the radar in a dedicated remote-sensing role. All such data is recorded automatically in the remote-sensing data base.

The signal processing tasks for remote-sensing applications can be divided into three categories. First there are main sequence processing operations which are common to many of the other missions of the radar; this category includes range processing, beam forming, Doppler analysis, and so on. Their main purpose as far as remote sensing is concerned is to produce Doppler spectra from a number of simultaneously interrogated range-azimuth cells using a combination of spatial and temporal incoherent averaging to stabilize the estimates. Also in this category are impulsive noise suppression tasks invoked to ameliorate corrupted spectra.

The second category embraces processing steps which are relevant almost exclusively to the remote-sensing objectives but which must be performed during or between main sequence operations and hence are subject to memory and execution time constraints. Tasks in this category address many of the feature extraction and parameter estimation operations that enable detailed analysis of the clutter spectra. For instance, Bragg-line recognition and measurement, detection and parameterization of multimode propagation and spectral broadening, determination of subclutter visibility, absolute power and noise levels, measurement and correction of slow phase path variations, recognition of land clutter for footprint registration, evaluation of several quality indices, computation of second-order clutter power in various Doppler bands, and selection of one or more representative spectra are all undertaken during a first pass through the data. On the basis of this information, a second pass can then be made with other algorithms adapted to the data characteristics. Features extracted during this second pass are used to make superior estimates of rms wave height and to assist in determining the directional wave spectrum.

The information extracted by the Category 2 tasks, together with relevant details of radar parameters, is stored in a disk file which is then available for the Category 3 tasks to access at any time. This last group includes tasks that transform feature values into meteorological and oceanographic variables, fit models, correlate radar estimates with in situ measurements, generate color displays of wind and sea-state information, calculate statistics and perform the numerical inversion of the representative Doppler spectra to yield directional wave spectrum estimates.

Figure 2:
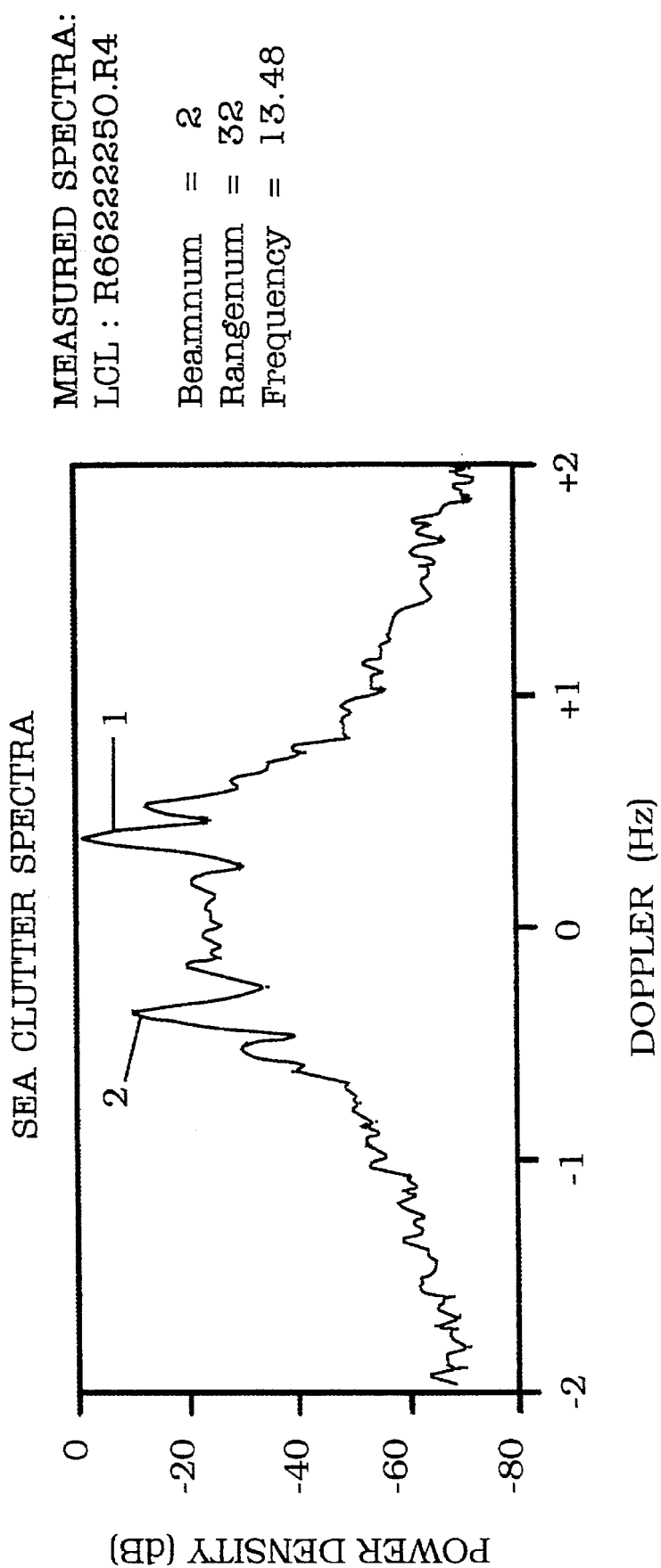
FIG. 2 shows a typical Doppler clutter spectrum.

A typical OTHR records sea-clutter Doppler spectra with a frequency resolution of 0.02 Hz. The map of FIG. 1 relates to wind direction obtained from measurements taken from an area off the northwest coast of Australia. HF sea clutter echoes were recorded using an OTHR system. The radar information was transformed to Doppler spectra of the form illustrated in FIG. 2. The amplitudes of the positive shifted peak 1 and the negative shifted peak 2 were measured and the ratio taken.

Figure 3:
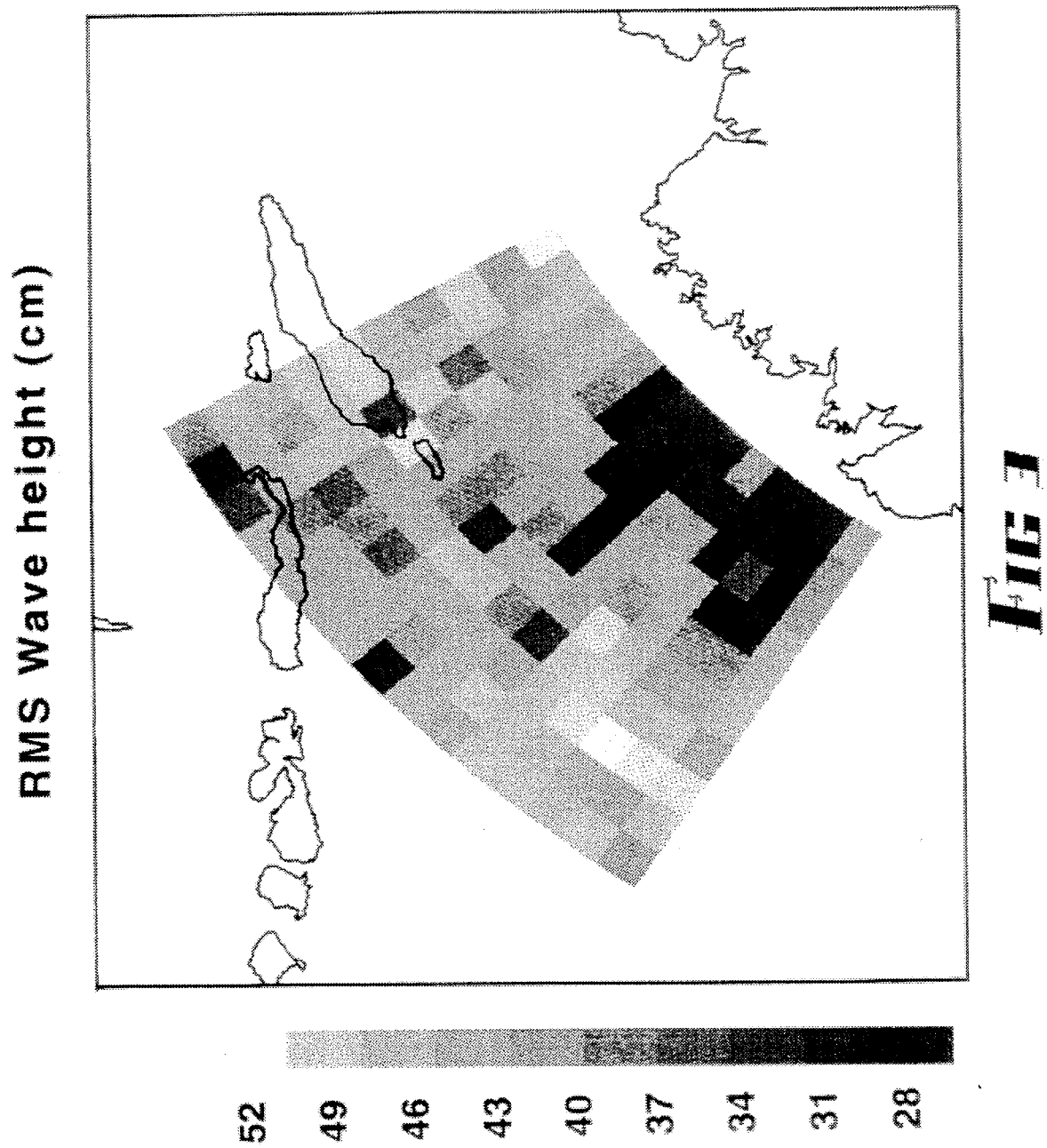
FIG. 3 shows a map of rms wave height.
Figure 4:
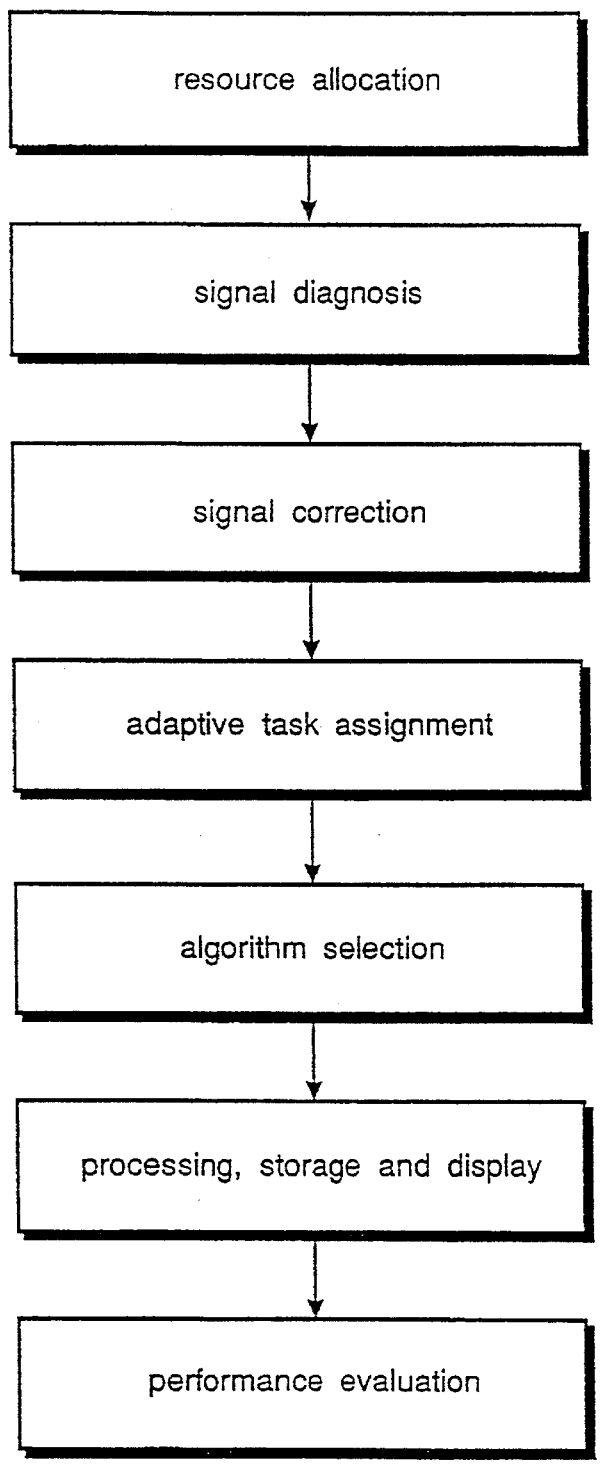
FIG. 4 shows a schematic of the principal steps invoked in adaptive remote sensing with HF radar.
Figure 6:
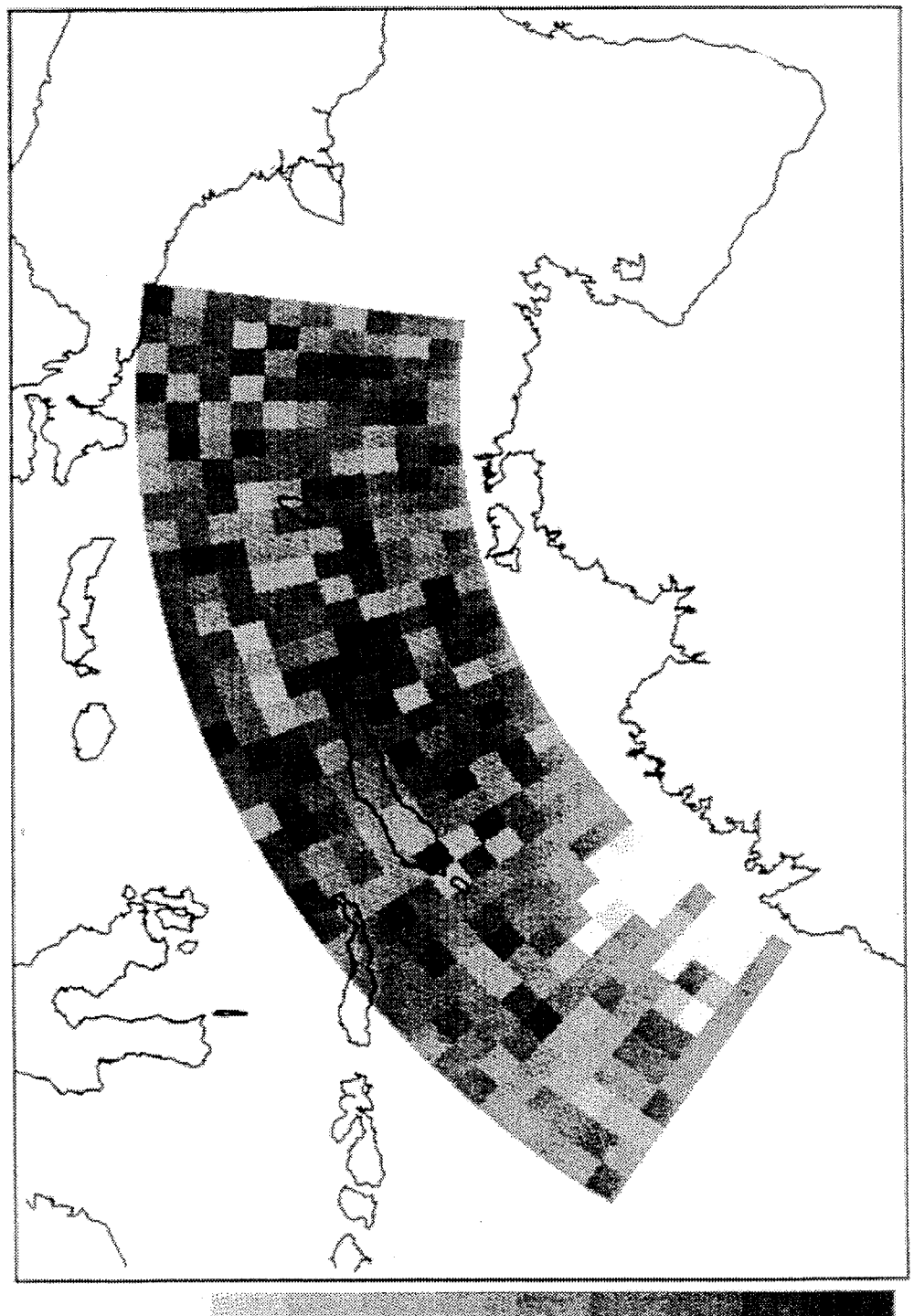
FIG. 6 shows a map of SDA category under favorable propagation conditions.
Figure 7:
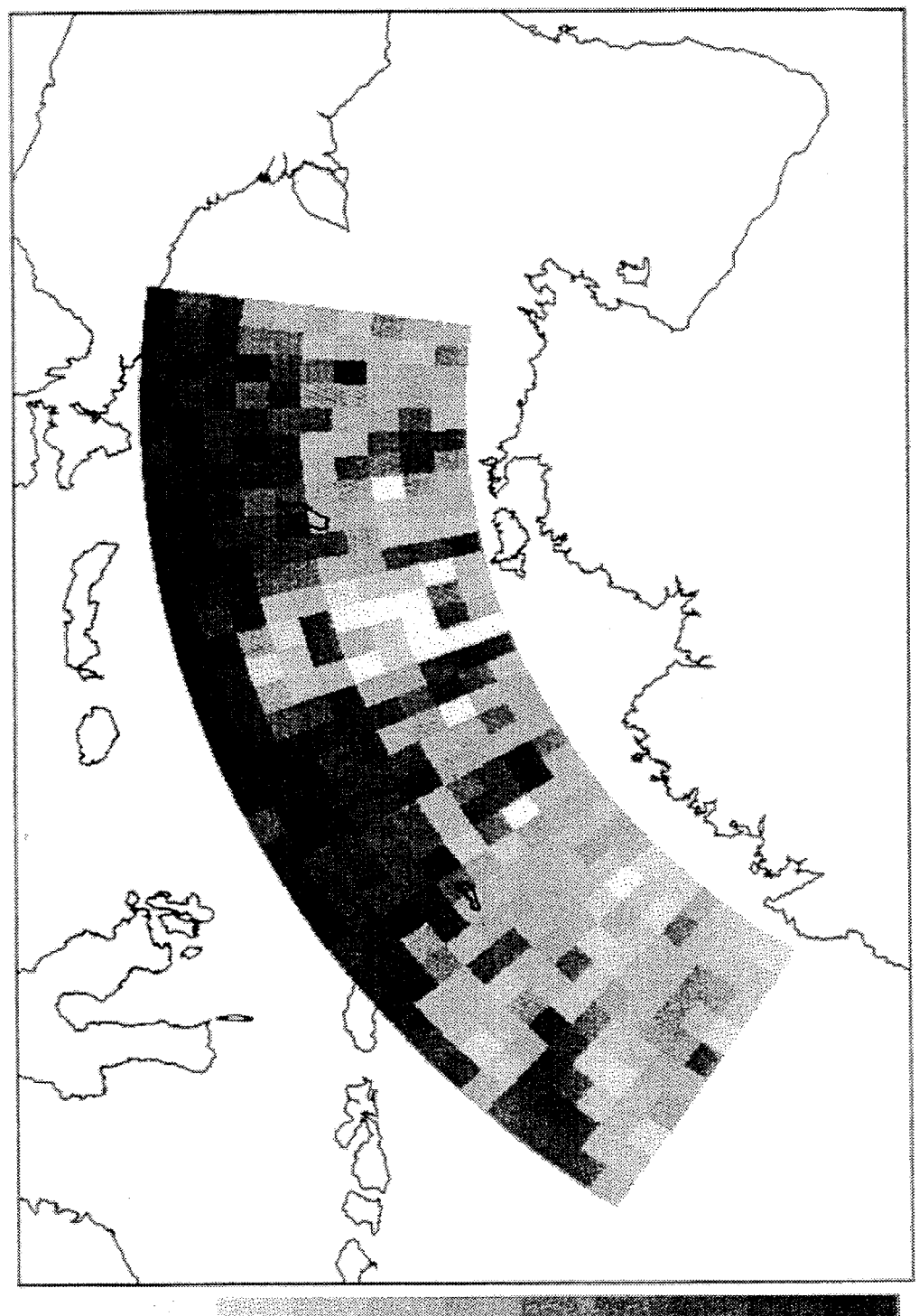
FIG. 7 shows a map of SDA category under poor propagation conditions.

FIG. 3 shows an example of a map of waveheight obtained from analysis of data of SDA category 6. FIG. 4 is a schematic diagram of principle steps involved in adaptive remote sensing with HF radar, while FIG. 5 illustrates by examples the progressive increase of data quality with SDA category. The categories represented are from top left categories 2, 3, 5, 6, 8, and 9. The need to adapt radar processing to suit data quality is conveyed by these examples. FIGS. 6 and 7 show maps of SDA category for instances of good (FIG. 6) and poor (FIG. 7) propagation.

Figure 8:
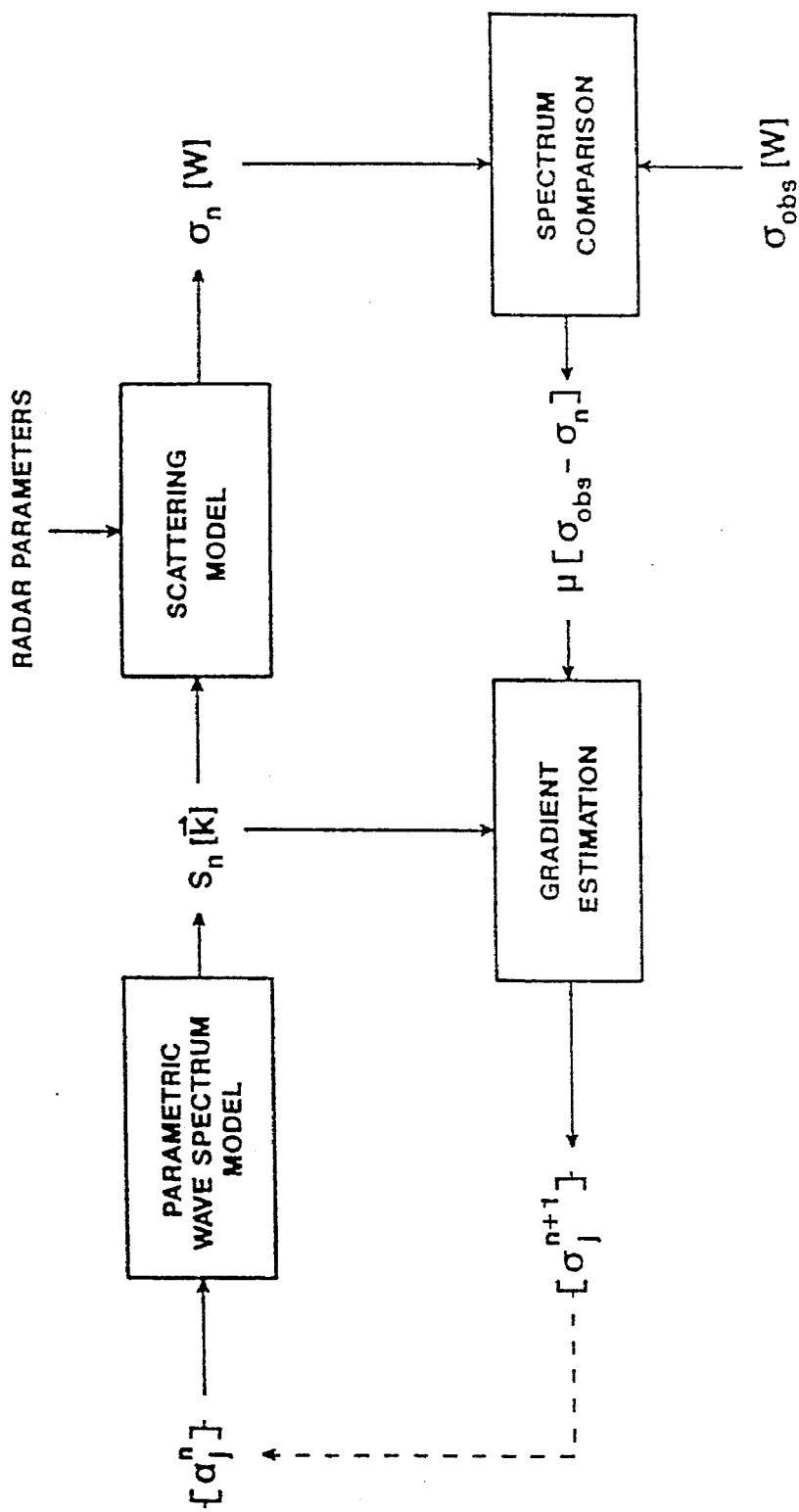
FIG. 8 is a schematic of a parametric method of determining a directional wave spectrum.

In determining directional wave information by a parametric approach, a theoretical Doppler clutter spectrum is calculated using a scattering model and initial wave field parameters $\{\alpha_j^i\}$. The actual recorded spectrum $\sigma_{obs}(W)$ is compared to the theoretical model $\sigma_n(W)$ and based on the difference $\mu$ the wave parameters are adjusted. The new set of wave parameters $\{\alpha_j^{n+1}\}$ is input to the scattering model to calculate an improved theoretical Doppler clutter spectrum which is again compared to the actual recorded spectrum. This process continues until the best fit is obtained between the theoretical spectrum and the actual spectrum thus yielding the required directional wave information. A detailed flowchart of the technique is shown in FIG. 8.

Figure 9:
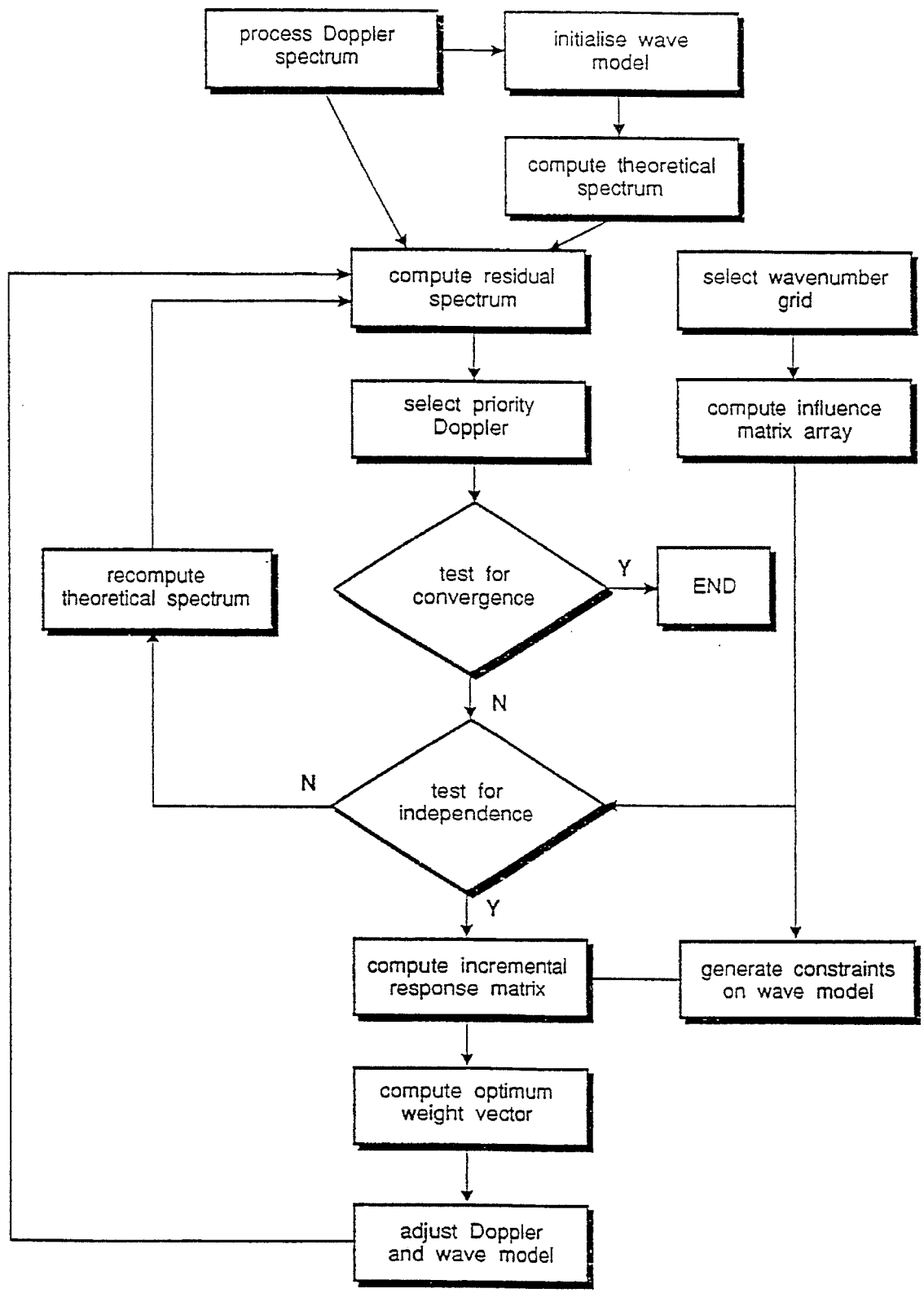
FIG. 9 is a schematic of a non-parametric method of determining a directional wave spectrum from Doppler clutter spectra by iterative adjustment of a discretized wave spectrum model.

A non-parametric approach to determining the directional wave spectrum is shown in FIG. 9. The procedure involves finding the difference between an initial guess theoretical spectrum and the measured spectrum. The Doppler cell with greatest discrepancy is identified and all possible wave spectrum adjustments capable of remedying the discrepancy are identified. A weighted combination of these adjustments is applied, subject to any physical constraints imposed and a new theoretical model is generated, ready for iteration to conveyance.

The integrity of the data estimates can be improved by obtaining spectral information from a number of different spectral regions and calculating a combined estimate. FIG. 10 shows three different methods of calculating the combined estimates under three different coupling regimes. In the zero-coupling approach, spectra recorded at different radar frequencies are processed independently and a final estimate of S(k) is obtained by taking a linear combination of the separate estimates. In the weak-coupling approach, spectra recorded at different radar frequencies are processed separately with each being subject to the constraint that the ratios of spectral intensities corresponding to Bragg resonance at the other radar frequencies be equal to the observed Bragg line ratios at those other frequencies.

In the strong-coupling approach, constraints reflecting both first- and second-order contributions at every frequency are imposed on the iterative adjustment process, yielding a single estimated directional wave spectrum.

FIG. 11 shows an example of a directional wave spectrum defined on a 720 element grid, together with the radar sea clutter Doppler spectrum from which it was derived.

This then describes the invention. The aim of the description is to indicate the nature of the invention and not to limit this. It will be evident to those skilled in the art that various techniques may be used to work aspects of the invention which will fall within the scope of the invention.

I claim:

1. A method of obtaining oceanographic and meteorological data from high frequency radio wave echoes comprising the steps of: resource allocation; signal diagnosis; signal correction; adaptive task assignment; method selection; processing, storage and display; and performance evaluation wherein:

the resource allocation step includes the steps of determining optimum parameters for the high frequency radio waves to which the method is to be applied;

the signal diagnoses step includes the steps of automatic examination and classification of received signals in terms of data quality and suitability for various levels of detailed analysis;

the signal correction step includes the steps of application of ameliorative signal processing techniques to improve signal quality by removing contamination and distortion;

the adaptive task assignment step includes the steps of nominating the oceanographic and meteorological information to be extracted on the basis of data suitability, availability of collateral information and requirements;

the method selection step further comprises the steps of choosing which technique should be employed to estimate each parameter; the processing, storage and display step includes the steps of execution of a requested task, storing processed data on disk or tape if desired and presentation of results on colour displays; and the performance evaluation step includes the steps of real-time and offline assessment of the accuracy of remote sensing output, display of discrepancies and feedback.

2. A method of obtaining an estimate of the directional wave spectrum from HF sea clutter spectral information comprising the steps of:

transmitting via the ionosphere a plurality of signals into a remote locality containing a sea surface;

recording signals backscattered from the locality via the ionosphere;

converting the backscattered signals to a Doppler spectrum; and numerically inverting the Doppler spectrum from the plurality of signals to obtain a directional wave spectrum.

3. A method of obtaining oceanographic and meteorological data from high frequency radar spectral information comprising the steps of:

recording opportunity signals backscattered from a remote location;

generating a family of Doppler clutter spectra from the recorded backscattered signal;

categorizing the Doppler clutter spectra according to Suitability for Detailed Analysis (SDA); and analyzing the categorized Doppler clutter spectra in terms of a model or models to generate oceanographic and meteorological data estimates.

4. The method of claim 3 further characterized by the recorded signals being corrected for contamination by radio frequency interference and other forms of degradation.

5. A method of obtaining oceanographic and meteorological data from high frequency radar spectral information comprising the steps of:

transmitting a plurality of signals to a remote geographic location;

recording signals backscattered from the said location;

generating a family of Doppler clutter spectra from the recorded backscattered signals;

categorizing the Doppler spectra according to Suitability for Detailed Analysis (SDA); and analyzing the Doppler clutter spectra in terms of a model or models to generate oceanographic and meteorological data estimates.

6. The method of claim 5 in which the Suitability for Detailed Analysis is established by incrementally analyzing each of a number of measured parameters of each spectrum wherein the parameters include sub-clutter visability (SCV), bragg line amplitudes, the amplitudes of other peaks, and resonances in the Doppler spectrum, the widths of these peaks, weighted sums of clutter spectral density over various Doppler frequency bands, parameters describing the slope and curvature of the Doppler spectrum over various Doppler frequency bands, and measures of the spatial and temporal variations of the Doppler spectrum.

7. The method of claim 5 further characterized by the recorded signals being corrected for contamination by radio frequency interference and other forms of degradation.

8. The method of claim 7 further characterized by the plurality of signals transmitted to the remote location having a range of carrier frequencies to obtain data in different regions of the frequency spectrum and thereby improve the integrity of the oceanographic and meteorological estimates.

9. The method of claim 8 in which the meteorological data estimates include estimates of wind speed and wind direction.

10. The method of claim 9 in which the wind direction is determined from a Bragg line ratio using an empirical relationship taking account of wavenumber to determine an angular spreading function.

11. The method of claim 9 in which the wind speed is obtained from a second order Doppler spectrum in conjunction with first order contributions.

12. The method of claim 9 further characterized in that ambiguity resolution is achieved by using a fluid model to analytically continue a wind field based upon seed values obtained from in situ sensors.

13. The method of claim 12 in which seed values are obtained from offshore weather stations.

14. The method of claim 9 further comprising the step of producing and displaying wind speed and direction in real time.

15. The method of claim 14 in which the wind speed and direction are displayed on color display terminals, said terminals also being adapted to display a range of other features of interest including a sequence of maps, day-to-day difference maps, vorticity and data quality parameters.

16. The method of claim 8 in which the oceanographic data includes sea state, dominant wave period, significant wave height, dominant wave direction, ocean currents, non-directional wave spectrum, directional wave spectrum and extended directional wave spectrum.

17. The method of claim 16 in which the oceanographic information is obtained from the second order Doppler spectrum in conjunction with first order contributions.

18. The method of claim 17 in which seastate is estimated by identifying uncontaminated parts of the Doppler spectrum and fitting a parametric wave spectrum model from above and below to obtain bounds on associated wave-heights.

19. The method of claim 17 in which seastate is estimated by computing a weighted sum of Doppler spectral estimates.

20. The method of claim 17 in which dominant wave period is obtained from the separation between first order and second-order contributions to the Doppler spectrum, taking processing factors into account.

21. The method of claim 17 in which significant wave height is obtained from the ratios of spectrum peaks at the first and second order resonances and weighted energy integrals over sub-bands of the Doppler spectrum.

22. The method of claim 17 in which dominant wave direction is estimated from the relative amplitudes of the second-order cut-off points.

23. The method of claim 17 in which ocean currents are estimated by analytic continuation of radial current fields measured by Doppler shifts of the two Bragg lines relative to zero-Doppler echoes from islands or oil rigs.

24. The method of claim 17 in which ocean currents are estimated by analytic continuation of radial current fields measured by estimates of mean clutter Doppler shifts from long-term behavior of ionospheric Doppler shifts.

25. The method of claim 17 in which nondirectional wave spectra are estimated from the shape and cut-off of the second-order continuum beyond the dominant Bragg line after weighting with a pre-computed function.

26. The method of claim 17 in which directional wave spectra are estimated by iterative adjustment of a nonparametric discrete wave spectrum model.

27. The method of claim 17 in which directional wave spectra are estimated by solving a linearized form of:

$$D(w) = \int F(k_1,w)S(k_1)dk_1 + \iint G(k_1,k_2,w)S(k_1)S(k_2)dk_1 dk_2$$

wherein D is the clutter Doppler spectrum, F is the first order scattering function, G is the second order scattering function and S is the directional wave spectrum.

28. The method of claim 2 in which the directional wave spectrum is obtained from those parts of the Doppler spectrum attributed to second order scatter as well as those parts of the Doppler spectrum attributed to first order contributions.

29. The method of claim 2 in which the numerical inversion is performed by iteratively fitting discretized theoretical spectra to the measured Doppler spectrum.

30. The method of claim 29 in which the recorded signals are corrected for contamination by radio frequency interference.

31. The method of claim 29 further characterized by the recorded signals being corrected for contamination by radio frequency interference and other forms of degradation.

\* \* \* \* \*